Nov. 12, 1929.   P. FAVOUR   1,735,162
MOTION PICTURE SCREEN
Filed Sept. 24, 1927
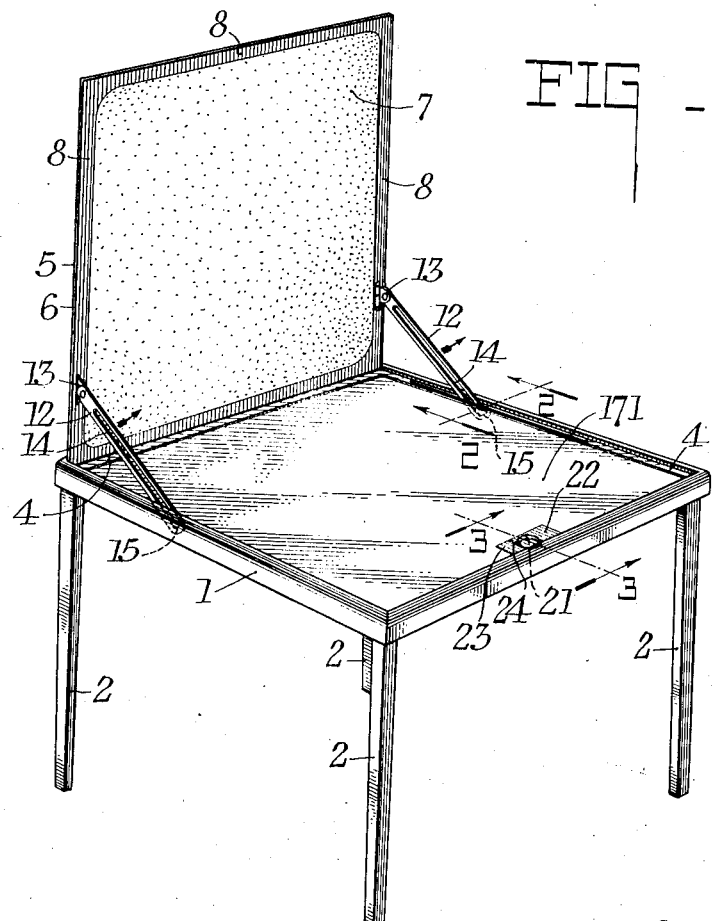
FIG. 1.
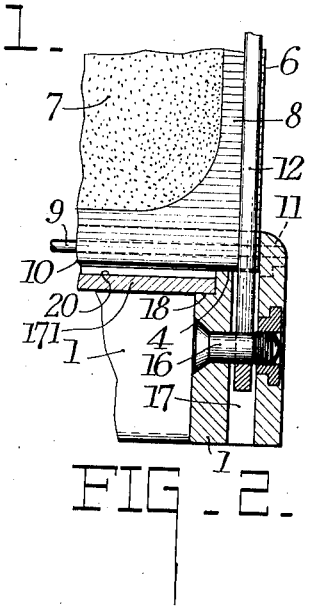
FIG. 2.
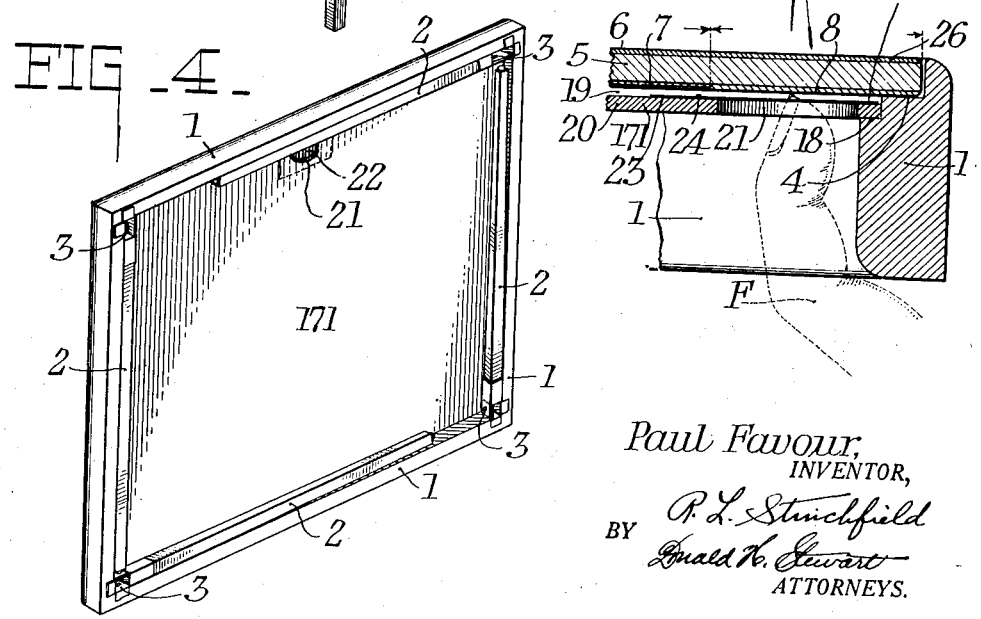
FIG. 3.
FIG. 4.
Paul Favour,
INVENTOR,
BY
ATTORNEYS.

Patented Nov. 12, 1929

1,735,162

UNITED STATES PATENT OFFICE

PAUL FAVOUR, OF ROCHESTER, NEW YORK, ASSIGNOR TO EASTMAN KODAK COMPANY, OF ROCHESTER, NEW YORK, A CORPORATION OF NEW YORK

MOTION-PICTURE SCREEN

Application filed September 24, 1927. Serial No. 221,701.

This invention relates to photography, and more particularly to motion picture projection screens especially adapted for use by amateur photographers. One object of my invention is to provide a flat screen surface which may be folded up into a relatively small space, and which is equipped with a screen support of the proper height for viewing motion pictures. Another object is to provide a motion picture screen in the form of a hinged table top having spaced legs for firmly holding the screen surface disposed in a substantially vertical position. Another object is to provide a motion picture screen which is protected from dust, finger marks, etc. when not in use. Another object is to provide a foldable motion picture screen which may be easily set up and taken down. Still another object of my invention is to provide a motion picture screen so mounted and arranged that the picture receiving surface is not touched in positioning the screen. And other objects will appear hereinafter from the following specification, the novel features being pointed out in the claims at the end thereof.

The problem of providing a satisfactory motion picture film screen for amateur use in the home so far as I am aware has not yet been solved in an entirely satisfactory way. Most motion picture screens must be either hung upon the wall or stood upon a table so that frequently the screen is either not placed upon a firm support or is not positioned at the most satisfactory height for receiving motion pictures. In order to retain compactness screens are usually provided with comparatively small folding supports which render them more or less unstable and the type of screens which secure compactness by rolling are difficult to keep flat. My present invention is designed to overcome these difficulties. Coming now to the drawings wherein like reference characters denote like parts throughout:

Fig. 1 is a perspective view of a motion picture screen constructed in accordance with and embodying a preferred form of my invention;

Fig. 2 is a fragmentary section on line 2—2 of Fig. 1;

Fig. 3 is a fragmentary detail section on line 3—3 of Fig. 1;

Fig. 4 is a perspective view of the embodiment of my invention shown in Fig. 1 folded up.

In order to secure the maximum rapidity I have provided a screen support in the form of a four-sided frame 1 which is supported by four legs 2 preferably hinged at 3 to the frame 1 in any suitable manner. As shown in Fig. 2 the frame 1 is preferably provided with a rabbet 4 which is of approximately the depth of the thickness 5 of the hinged top 6, this top forming a supporting member for the picture receiving surface 7.

This surface may be of any of the well known types those preferably of the "silver screen" variety, such screen usually being made from finely divided metallic aluminum carried in a suitable vehicle. I prefer to provide a light absorbing frame 8 around the edge of the screen, such as black paint, paper, or the like, because such a border enhances the brightness of the screen, and has additional useful functions which will be hereinafter pointed out.

The screen support 6 is preferably hinged in the rabbet 4 by means of a hinged pintle 9 passing through one edge 10 of the screen and being carried by bearings 11 which are supported in the frame. Links 12 are preferably hinged at 13 to the lower edges of the screen support, these links having slots 14 which terminate in hook-shaped ends 15, and which, as best shown in Fig. 2, engage studs 16 which pass through slots 17 in portions of the frame members 1. Thus it will be seen that the screen 7 may be swung through approximately 90° from a substantially horizontal to a substantially vertical position, and when in the latter position the screen may be firmly supported by links 12, the hooks 15 of the slots 14 engaging the pins 16.

In order to protect the screen surface 7 from dirt, finger marks, and the like I provide a protector in the form of a flat plate 171 which may lie in the screen rabbet 18 in the edges of the frame members 1. This plate may be made of any light material, and, as shown in Figs. 2 and 3 is preferably of less thickness than the depth of rabbet 18, so that there is left a space 18 between the screen surface 7 and the top 20 of member 171.

Near the front or that side of member 171 furthest away from the hinge 9 there is an aperture 21 in the plate, this aperture being normally covered by the flap 22 which is attached at 23 to member 171, and which is of flexible material, such as real or imitation leather, so that it may bend freely across an edge 24 along which it is attached to member 17. This prevents dirt from entering into the aperture 19 between the screen and protector while at the same time it permits the screen to be turned about its hinge as indicated in Fig. 3 where a finger F is shown in dashed lines in position to raise the screen.

As also shown in this figure the picture receiving surface 7 lies beyond the aperture 21, and the frame 8 lies directly above the aperture so that in starting to open the screen as above described, pressure is applied near the aperture, and will not tend to mar the delicate screen surface.

In effect the structure above described forms a table having two tops, the upper top 6 forming the support for the picture receiving surface and the lower top 171 forming a protector by which the surface 7 is protected when in a folded position. Such a structure has an additional advantage of being useful for other purposes, such as playing cards. The outer surface 26 of the support 6 may be of any material which is suitable, being preferably of real or artificial leather. However, I do not claim any particular material as obviously a large number of different substances are suitable.

The operation of my screen support is simple. The table folded as shown in Fig. 4 may be set up by drawing out the legs 2, and then by pressing a finger through aperture 21 to raise the table top 6 until the hooks 15 of links 12 engage pins 16, the table top 5 being swung about the hinged pintle 9 during this operation. The screen surface 7 will then be supported firmly by the frame member 1 and legs 2 in the picture receiving position which is substantially vertical. After the pictures are shown, by drawing upwardly on the links (the direction indicated by the arrows of Fig. 1) the screen may be swung from the picture receiving position at substantially 90° from the screen protector 171 to a substantially horizontal position in which it is adjacent to and adapted to be protected by the protector 171 as indicated in Fig. 3. In this position the screen support 6 forms a table top which may be used for other purposes.

It should be noted that with the construction above described the screen surface 7 is firmly supported by the four legs 2 which are spaced a sufficient distance apart to carry the weight of the parts firmly without vibration. The height of the legs 2 may be such that the center of the screen is approximately at the eye level of the average person seated in a chair, so that in this way the screen support does not require height adjustments.

Having thus described my invention, what I claim as new and desire to secure by Letters Patent is,—

1. In a motion picture screen support, the combination with a table top, of a picture receiving surface carried by one side thereof, a frame, hinged connections between the frame and the table top, legs carried by the frame, an apertured screen protector carried by the frame, and means permitting the screen to be swung through an arc of substantially 90° to and from the apertured protector, means for supporting the screen when swung from the protector, and a cover for the aperture in the protector, said cover being movable to permit an operator to thrust upwardly upon the table top to swing the screen about its hinge into a picture receiving position.

2. In a motion picture screen support, the combination with a narrow frame, of two closely spaced table tops carried by said frame towards one edge thereof, one top being fixedly attached to the frame and the other top being movably attached thereto, a hinged connection between the movable top and the frame upon which the top may be moved to an angle of substantially 90° with respect to the fixed top, a link for holding the movable top in an erect position, a picture receiving surface supported on the hinged top, a light absorbing medium surrounding said picture receiving surface and a plurality of legs hingedly attached to the frame and movable to and from an inoperative position in which they may lie adjacent that edge of the frame which is opposite to the table tops, whereby a compact thin screen support is provided which may be readily folded into a small place.

3. In a motion picture screen support, the combination with a narrow frame, of two closely spaced table tops mounted on the frame, one of said table tops lying wholly within the frame and being fixedly attached thereto, the other table top being hingedly attached to one side of the frame and being adapted to move to and from an operative position at an angle to the other top, a hinged link adapted to hold the hinged top in an operative position, a picture receiving surface attached to that side of the hinged top which faces the second table top when the parts are in a folded position whereby said picture receiving surface may be protected by said table top when the parts are in a folded position, a plurality of legs hingedly attached to the frame and movable to and from an operative position in which they lie adjacent the edges of the frame, said movably mounted table top and legs being foldable towards each other and into a compact support.

Signed at Rochester, New York, this 20th day of September, 1927.

PAUL FAVOUR.